Oct. 10, 1933.  E. PERLMAN  1,929,605
FILTERING DEVICE
Filed Dec. 14, 1931
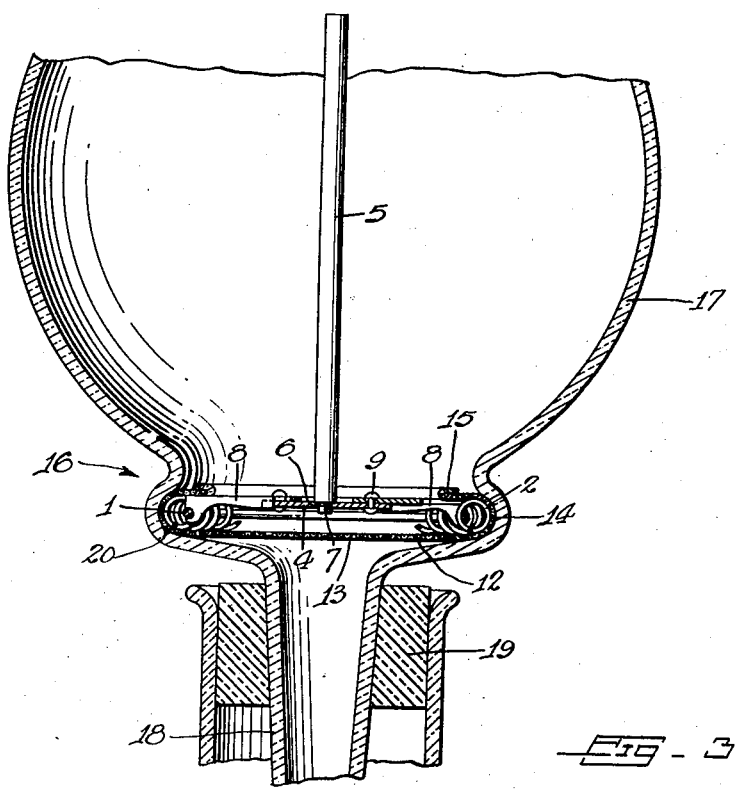
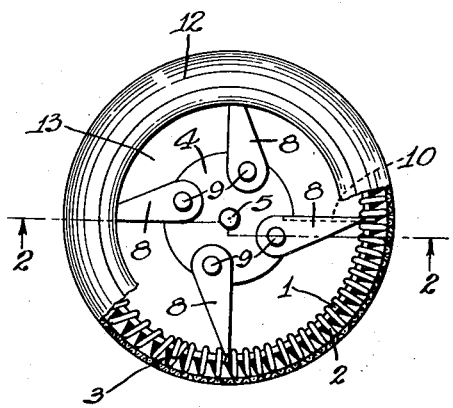
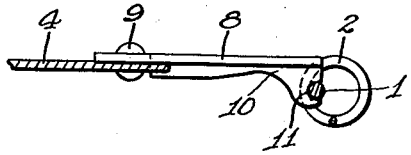
Edward Perlman
INVENTOR
BY Munn & Co.
ATTORNEYS Patented Oct. 10, 1933

1,929,605

UNITED STATES PATENT OFFICE 1,929,605

FILTERING DEVICE

Edward Perlman, Cicero, Ill.

Application December 14, 1931, Serial No. 581,003

5 Claims. (Cl. 210—162)

My invention relates to improvements in filtering devices, and it consists in the combinations, constructions, and arrangements herein described and claimed.

An object of my invention is to provide a filtering device particularly adapted for use in non-metallic coffee urns and the like.

A further object of my invention is to provide a filtering device adapted for being quickly and easily insertable in and removable from containers having an annular groove.

A further object is to provide a novel means whereby a filtering member within a coffee urn may be quickly and easily secured in or disconnected from its filtering position.

A further object is to provide a retaining means for holding a filtering member within a tubular member.

A further object of my invention is to provide a device which will securely engage the inner walls of a tubular member in a spring-pressed manner.

A further object is to provide a device which is an improvement over the device of my co-pending application, Serial No. 501,391.

A further object is to provide a device which is simple in construction, durable in use, economical to manufacture, and efficient and convenient for the purpose intended.

Other objects and advantages will appear in the following specification, and the novel features of the invention will be particularly pointed out in the appended claims.

My invention is illustrated in the accompanying drawings, forming part of this application, in which Figure 1 is a top plan view of the device of my invention showing the filtering element partly broken away, Figure 2 is a section taken along the line 2—2 of Figure 1, and Figure 3 is an enlarged sectional view of a lower portion of my device.

In carrying out my invention, I provide a ring 1 which is encircled by a helical coil 2, the ends of which may abut against each other, as is indicated at 3. The ring 1 may be made of metal or any other suitable material. The helical coil 2 is preferably made of any sufficiently resilient material, such as, for instance, plated steel.

I also provide a disc 4 having an upstanding rod 5. The disc 4 may, if desired, be provided with a threaded opening 6 adapted to threadedly receive a lower threaded portion 7 of the rod 5. The disc 4 may also be provided with a plurality of radically extending arms 8 which may be formed integral with the disc or secured thereto by any suitable means, such as, for instance, bolts or rivets 9. These arms may be angular in form and may be provided with a vertical end portion 10 having a recessed portion 11 of a size adapted to rigidly engage the ring 1 when the device is assembled.

The filtering device may be provided with a flexible porous or perforated filtering element 12 having a diaphragm 13 and an integral annular curved portion 14 having an inwardly extending flange 15. The filtering element may, if desired, be made of cloth.

From the foregoing description of the various parts of the device, the operation thereof may be readily understood. In operation, the device of my invention may be employed with any container which may be provided with a neck portion 16 shown fragmentarily in Figure 2. The container may be provided with a bowl 17 having a reduced outlet portion 18 which may be held in position by a seal 19 which is preferably formed from flexible or compressible material, such as rubber or the like.

When the bowl and container are connected as shown in Figure 2, the interior of the container is of course sealed from the atmosphere. This container and bowl construction is disclosed in my co-pending application and constitutes a coffee urn or percolator, the construction of which is now well known to the art and is thought to require no further description. It is sufficient to say that when the container is partly filled with water and the container is sufficiently heated, that a portion of the water is forced upwardly through the neck in the container.

The container is provided with an annular groove 20. The device of my invention may be conveniently inserted in the bowl through its open upper portion by grasping the rod 5 and placing a portion of the ring and coil in the groove 20. The rod 5 may then be brought to a vertical position which will force the flexible coil inwardly sufficiently for it to engage the remaining portion of the groove.

Coffee or tea may then be placed in the bowl and the container may be partially filled with water and placed over a slow fire. The water in the container will soon be forced upwardly through the filtering element 12 where it will remain while the container is being heated. When the container has been removed from the fire, the liquid will descend through the filtering element into the container. It is then ready to be used as a beverage.

I claim:

1. A device of the character described including a central section and a peripheral section, said peripheral section comprising a helical wire and a ring disposed within the coils of said wire, said central section comprising a disc having an upright handle portion and a plurality of radially extending arms for engaging the ring.

2. A device of the character described including a central section and a peripheral section, said peripheral section comprising a helical wire and a ring disposed within the coils of said wire, said central section comprising a disc having an upright handle portion and a plurality of radially extending arms for engaging the ring, each of said plurality of arms having a vertical recessed end portion for fixedly engaging said ring.

3. A device of the character described including a central section and a peripheral section, said peripheral section comprising a helical wire and a ring disposed within the coils of said wire, said central section comprising a disc having an upright handle portion and a plurality of radially extending arms for engaging the ring, said disc and said arms being rigidly connected together.

4. A device of the character described including a central section and a peripheral section, said peripheral section comprising a helical wire and a ring disposed within the coils of said wire, said central section comprising a disc having an upright handle portion and a plurality of radially extending arms for engaging the ring, said helical wire entirely surrounding said ring and being provided with end portions, the end portions of said wire engaging each other in a spring-pressed manner.

5. A filter holder comprising a central member provided with a vertically extending handle and a plurality of radially extending arms, a ring secured to the ends of said arms, a helical spring surrounding said ring, and a filter carried by said spring and adapted to be pressed by the same against the annular wall of a receptacle.

EDWARD PERLMAN.